(12) United States Patent
Hudson

(10) Patent No.: US 12,077,201 B2
(45) Date of Patent: Sep. 3, 2024

(54) TEMPORARILY ATTACHABLE SLED DEVICE FOR HUMAN-POWERED HOUSEHOLD VEHICLES

(71) Applicant: Craig Hudson, Warwick (GB)

(72) Inventor: Craig Hudson, Warwick (GB)

(*) Notice: Subject to any disclaimer, the term of this patent is extended or adjusted under 35 U.S.C. 154(b) by 273 days.

(21) Appl. No.: 17/601,423

(22) PCT Filed: Apr. 3, 2020

(86) PCT No.: PCT/IB2020/053210
§ 371 (c)(1),
(2) Date: Oct. 4, 2021

(87) PCT Pub. No.: WO2020/202099
PCT Pub. Date: Oct. 8, 2020

(65) Prior Publication Data
US 2022/0194459 A1    Jun. 23, 2022

(30) Foreign Application Priority Data
May 15, 2019  (GB) .................................. 1906827

(51) Int. Cl.
*B62B 19/02*    (2006.01)
(52) U.S. Cl.
CPC .................................. *B62B 19/02* (2013.01)
(58) Field of Classification Search
CPC .................................................. B62B 19/02
See application file for complete search history.

(56) References Cited

U.S. PATENT DOCUMENTS 1,345,307 A * 6/1920 Altland ................... B62B 19/02
280/13
2,352,966 A * 7/1944 Morando ................ B62B 19/02
280/8
(Continued)

FOREIGN PATENT DOCUMENTS

CA    2249107 A1    4/2000
CA    2711963 C     12/2015
(Continued)

OTHER PUBLICATIONS

International Search Report from International Patent Application No. PCT/IB2020/053210 mailed Oct. 5, 2020, 4 pages.
(Continued)

*Primary Examiner* — Jeffrey J Restifo
(74) *Attorney, Agent, or Firm* — Klintworth & Rozenblat IP LLP

(57) ABSTRACT

A temporarily attachable sled device for human-powered household vehicles includes a main body and at least one front end chock assembly and at least one rear end chock assembly. The main body is formed of a substantially waterproof sheet, with substantially at least the lower face of the sheet formed as a low friction surface. The at least one front end chock assembly and the at least one rear end chock assembly extending from the upper surface of the main body in use. The main body and the chock assemblies are sized and shaped so that a household vehicle can be positioned on the upper surface of the main body and prevented from riding up and over the chock assemblies. The main body includes ridges along and extending upwards from each side of the main body, the ridges extending substantially the length of the sides.

23 Claims, 10 Drawing Sheets

(56) References Cited

U.S. PATENT DOCUMENTS

| | | | | |
|---|---|---|---|---|
| 3,774,926 A * | 11/1973 | Chase | ............ | B62B 19/02 |
| | | | | D12/604 |
| 4,116,455 A * | 9/1978 | Dotson | ............ | A63C 17/18 |
| | | | | 280/14.25 |
| 4,161,323 A * | 7/1979 | Wetteland | ............ | A63C 17/18 |
| | | | | 280/14.25 |
| 4,194,753 A * | 3/1980 | Schrishuhn, Jr. | ............ | B62B 13/06 |
| | | | | 280/14.25 |
| 4,479,657 A * | 10/1984 | Reynolds | ............ | B62B 13/18 |
| | | | | 280/8 |
| 5,407,217 A * | 4/1995 | Lambert | ............ | B62B 19/02 |
| | | | | 280/47.38 |
| 5,413,361 A * | 5/1995 | Mosher | ............ | B62B 19/02 |
| | | | | 280/8 |
| 5,427,390 A * | 6/1995 | Duncan | ............ | B62B 19/02 |
| | | | | 280/47.38 |
| 5,584,787 A * | 12/1996 | Guidry | ............ | A63B 21/0004 |
| | | | | 482/79 |
| 6,708,989 B1 * | 3/2004 | Braun | ............ | A63C 17/28 |
| | | | | 280/8 |
| 6,981,705 B1 * | 1/2006 | Jolley | ............ | B62B 13/06 |
| | | | | 280/28.12 |
| 9,950,732 B1 * | 4/2018 | Patterson | ............ | B62B 19/02 |
| 10,023,220 B1 * | 7/2018 | Samuelian | ............ | B62B 19/02 |
| 10,343,705 B1 * | 7/2019 | Farrar | ............ | B62B 9/142 |
| 11,008,035 B1 * | 5/2021 | Walker | ............ | B62B 9/08 |
| 11,097,763 B1 * | 8/2021 | Klassen | ............ | B62B 19/02 |
| 2010/0289231 A1 * | 11/2010 | Huot | ............ | B62B 19/02 |
| | | | | 280/13 |
| 2017/0008543 A1 * | 1/2017 | Elliott | ............ | B62B 3/102 |
| 2018/0127016 A1 | 5/2018 | Weisbrod | | |
| 2021/0129887 A1 * | 5/2021 | Walker | ............ | B62B 9/142 |
| 2022/0194459 A1 * | 6/2022 | Hudson | ............ | B62B 19/02 |

FOREIGN PATENT DOCUMENTS

| | | |
|---|---|---|
| DE | 20013148 U1 | 9/2000 |
| GB | 2487791 A | 8/2012 |
| SE | 1130102 A1 | 4/2013 |

OTHER PUBLICATIONS

Written Opinion from International Patent Application No. PCT/IB2020/053210 mailed Oct. 5, 2020, 4 pages.
Machine translation of DE 20013148 U1.
Machine translation of SE 1130102 A1.

* cited by examiner

TEMPORARILY ATTACHABLE SLED DEVICE FOR HUMAN-POWERED HOUSEHOLD VEHICLES

FIELD

The present invention relates to a temporarily attachable sled device for human-powered household vehicles.

BACKGROUND

Vehicles such as pram or buggies are commonly used by parents to transport young children outside the house before they can walk themselves, or for longer trips where they will tire before completing the journey. The pram or buggy is normally kept/stored inside the home, and is loaded/unloaded as necessary in the hall or a similar location which can often be a distance away from the entrance of the house. When trips are made in inclement weather, such as when there is or has recently been rain or snow, the wheels and lower part of the pram will become wet and covered in dirt. On returning home, it can be difficult for the parent or carer to prevent this from being brought inside by, for example, dripping or being wheeled onto and into the hallway carpet especially if it is moved a distance through the house to reach a location it is kept/stored.

CA2711963C describes and shows a 'carpet slider' for a pram where the slider is connected to the pram via straps that hold the slider in position around the wheels and lower frame of the pram. 'Carpet' as used in this document refers to the attached device itself, as it is intended for outside use, on snow or similar.

GB2487791A describes and shows a slidable floor mat for protecting a floor from dirt or moisture. The mat requires clips to be attached to a pram or similar.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY

It is an object of the present invention to provide a temporarily attachable sled device for human-powered household vehicles which goes some way to overcoming the abovementioned disadvantages or which at least provides the public or industry with a useful choice.

The term "comprising" as used in this specification and indicative independent claims means "consisting at least in part of". When interpreting each statement in this specification and indicative independent claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

Accordingly, in a first aspect the present invention may broadly be said to consist in a temporarily attachable sled device for human-powered household vehicles, comprising: a main body comprising a substantially waterproof sheet, substantially at least the lower face of the sheet formed as a low friction surface; at least one front end chock assembly and at least one rear end chock assembly extending from the upper surface of the main body in use, the main body and chock assemblies sized and shaped so that a household vehicle can be positioned on the upper surface of the main body and prevented from riding up and over the chock assemblies.

In an embodiment, the main body is substantially formed from a square or rectangular sheet.

In an embodiment, the main body is substantially formed from plastic.

In an embodiment, the main body further comprises ridges along and extending upwards from each side of the main body, the ridges extending substantially the length of the sides.

In an embodiment, the main body comprises a central folded section configured so that the two sides each side of a central section running along the central long axis of the main body can be folded under-and-back.

In an embodiment, the sled device further comprises a set of wheels or rollers located on the underside of the main body.

In an embodiment, the sled device further comprises at least one pad of soft material attached to the underside of the main body.

In an embodiment, the at least one pad comprises four pads attached to the underside of the main body at or towards the corners of the main body.

In an embodiment, the main body comprises a main central part and a plurality of separate/separable end parts arranged in use to partly overlap, the central part and separate/separable end parts connected at their overlapping parts, each of the end parts comprising a chock component on it's outer end configured to support and/or hold a part of a household vehicle positioned on that corner element.

In an embodiment, the central part and separate/separable end parts are connected at their overlapping parts via a hook and loop fastening on the adjacent contacting surfaces.

In an embodiment, each chock assembly comprises a substantially solid element having at least one flat face, the flat face and portions of the upper face towards the ends of the main body comprising a mutual connection means to allow releasable connection of the front and rear end chock assemblies to the upper surface of the main body.

In an embodiment, the mutual connection means is a hook-and-loop fastener.

In an embodiment, one part of the hook-and-loop fastener comprises a strip.

In an embodiment, one part of the hook-and-loop fastener comprises a plurality of coins.

In an embodiment, the mutual connection means comprises sticky pads.

In an embodiment, the mutual connection means comprises double-sided adhesive tape.

In an embodiment, the mutual connection means comprises wrapping the main body partly or fully-over the end chocks and attaching the main body to itself by one or more of: a hook-and-loop fastener; sticky pads; double-sided adhesive tape.

In an embodiment, each chock assembly comprises a comprise a row or series of wedges, oriented so that there is a vertically aligned gap between each wedge, the wedges configured so that in use, the wheel or similar part of a household vehicle can be positioned in the gap so that the wedges grip and/or clamp the wheel or similar part of a household vehicle to prevent the vehicle from riding off the sled device.

In an embodiment, each chock assembly comprises a shoe section comprising a shoe body part configured to block movement of a household vehicle located on the main body and prevent this from moving over or through the shoe section, and a pair of outside extension sections at each side of the shoe body, the extension sections configured to prevent a household vehicle on top of the main body from slipping off to the sides of the shoes.

In an embodiment, the shoes sections are connected to the main body via rolled up end edges of the main body that attach to the outer surface of the shoes via an adjustable and/or detachable fastening comprising one of more of: a hook and loop fastening; a friction grip; a mechanical clamp.

In an embodiment, the chock assemblies comprise a foam roll and main body end, the end of the main body rolled around the foam roll, the chock assembly further comprising a friction grip/snap clamp configured to extend around the outer part of the rolled-together foam roll and main body, the friction grip/snap clamp at least partly formed from a semi-rigid material so that the friction grip/snap clamp holds it's shape in use.

In an embodiment, the friction grip/snap clamp further comprises a high friction material on the inside surface of the snap clamp.

In an embodiment, the sled device further comprises a foam cover configured to locate over the top of the friction grip/snap clamp.

In an embodiment, the snap clamp claim is configured so that the underside of the snap clamp extends to rest on the floor in use.

In an embodiment, the foam roll is shaped so that when viewed from one end it appears as one of: circular; circular with a flattened underside; triangular with a rounded top.

In an embodiment, the chock assemblies comprise foam cylinders, the main body rolled partly around the foam cylinders, and a clamp, the clamp configured with a hollow central aperture that corresponds to the rolled foam/main body combination, the clamp gripping around the rolled foam cylinder/main body in use, the clamp configured to open via a hinge and to lock in position in use.

In an embodiment, the clamp further comprises a plurality of ribs aligned in parallel with one another in use in parallel with the long edges of the main body.

In an embodiment, the clamp further comprises side walls at each end of the clamp, extend inwards in parallel with the ribs, the walls configured to prevent sideways movement of an item on the sled in use.

In an embodiment, the clamp further comprises a high-friction layer on at least part of the inner surface of the central aperture.

In an embodiment, the sled device further comprises an edge trim configured to be fitted to the outer edges of the main body.

In an embodiment, the main body and chock assemblies are formed as a unitary item.

In an embodiment, the chock assemblies are positioned so that in use a household vehicle is positioned inside the chock assemblies.

In an embodiment, the chock assemblies are positioned so that in use the chock assemblies are positioned on the inside of the footprint of the household vehicle.

With respect to the above description then, it is to be realised that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

BRIEF DESCRIPTION OF THE FIGURES

Further aspects of the invention will become apparent from the following description which is given by way of example only and with reference to the accompanying drawings which show an embodiment of the device by way of example, and in which:

FIG. 10b shows a side cross-sectional view of the view of the front end of the sled device of FIG. 10a.

DETAILED DESCRIPTION

Embodiments of the invention, and variations thereof, will now be described in detail with reference to the figures.

In a first embodiment, the sled device 1 has a main body 2 and end chock assemblies 3 at each end of the main body—front and rear chock assemblies.

The main body 2 in this embodiment comprises a flat sheet, formed from plastic sheet (e.g. polypropylene (PP), polyethylene/polythene (PE), polyvinyl chloride (PVC), polyethylene vinyl acetate (PEVA) or nylon fabric with a polyurethane (PU) coating). The main body 2 is rectangular in plan view and is thin and flexible enough so that it can be rolled or folded and will maintain it's structural integrity. The plastic underside or under-surface of the main body 2 is smooth and low friction. This allows the main body 2 in use to slide or slip over carpeted or laminated or wooden or stone or tile floors or similar relatively easily.

Figure 1:
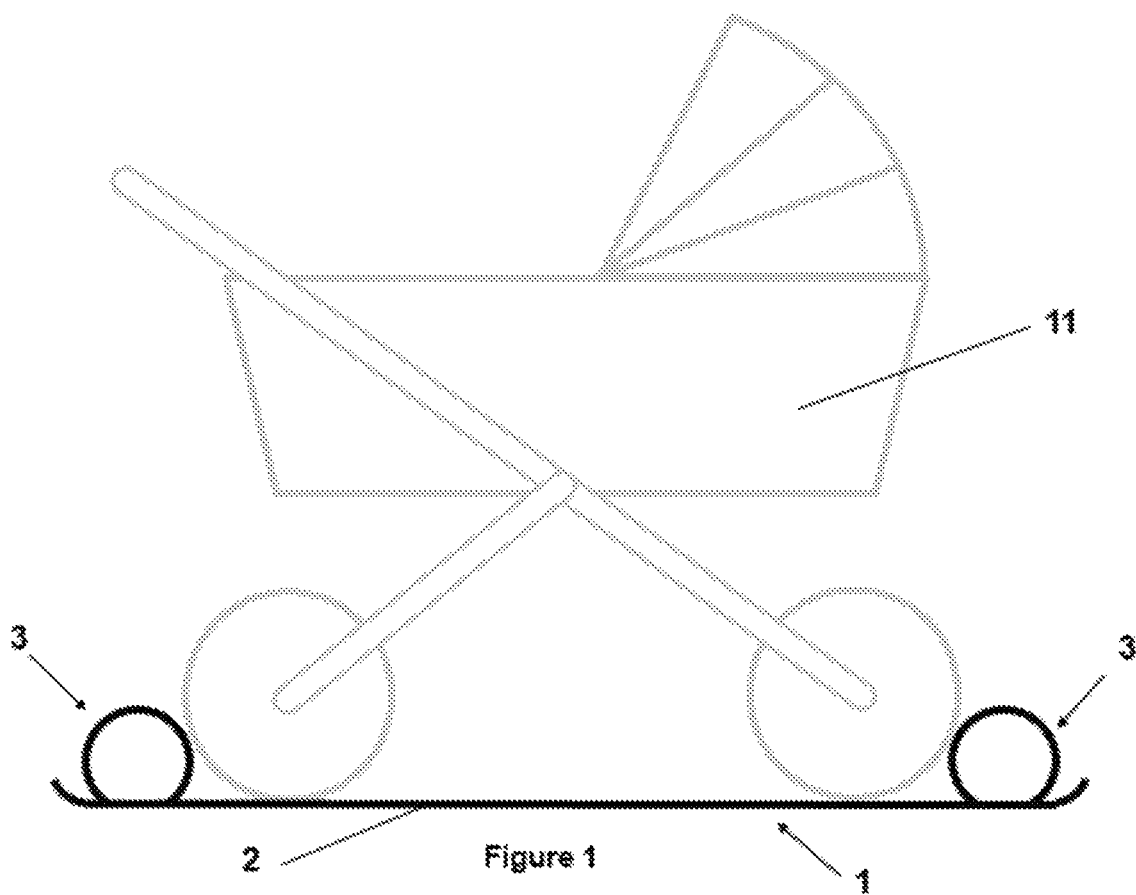
FIG. 1 shows a side view of a sled device according to an embodiment of the invention, the sled device having a main body comprising a flat flexible waterproof sheet, and a front end chock and a rear end chock extending from the upper surface of the main body, the chocks sized and shaped to hold a household vehicle positioned therebetween in position and to prevent the vehicle from riding up and over the chocks, the sled device shown ready for use with a pram positioned on top of the sled device.
Figure 2:
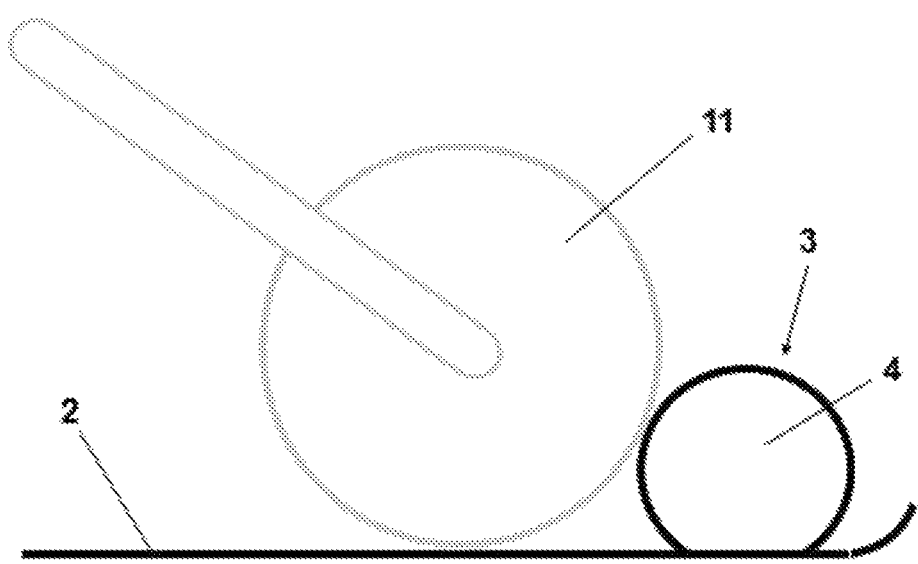
FIG. 2 shows a close up side view of the front end of the sled device of FIG. 1.

As shown in FIG. 1, the main body 2 is sized so that a pram or buggy 9 or similar can rest on top of the main body 2 without overhanging at the sides or ends. The main body 2 provides a waterproof barrier between the wheels of the pram or buggy 9, and any drip or spills from the body of the buggy itself located above the main body 2.

The end chock assemblies 3 are located at either end of the main body 2, connected to the main body 2 in the manner described in detail below.

Figure 3:
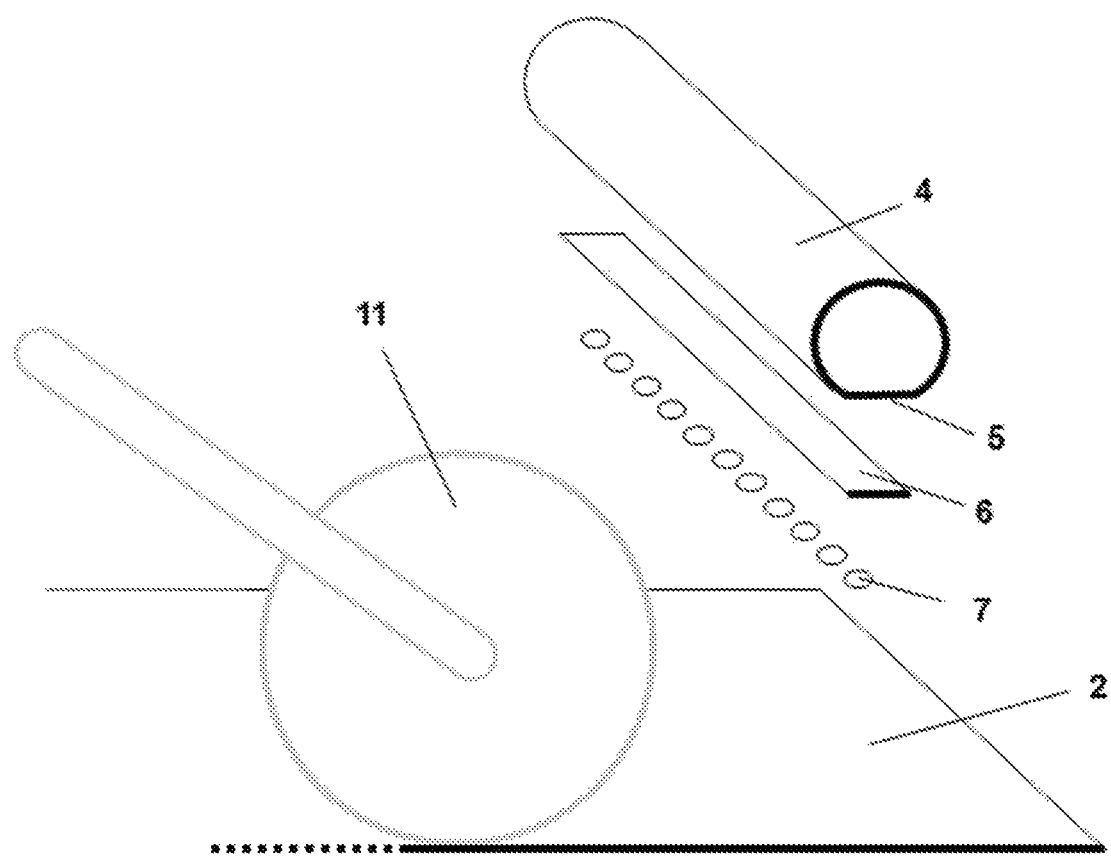
FIG. 3 shows an exploded perspective view of the front end of the sled device of FIGS. 1 and 2 from the side and rear and looking forwards.

Each end chock assembly 3 comprises a plastic foam or rubber foam cylinder element 4 that is generally substantially cylindrical. In variations, the element 4 could be for example D-shaped, triangular, or teardrop-shaped in overall cross-sectional shape when viewed from the end. As shown in FIG. 3, the first part 6 of a hook-and-loop fastening strip and coin arrangement pair is connected (e.g. via an adhesive backing strip or similar) to the flattened section 5. The second part 7 of the hook-and-loop fastening strip and coin arrangement pair is connected to the top surface of the main body 2, towards one end, slightly inwards of the end. This allows the cylinder element 4 to be detachably connected (via the hook-and-loop fastening strip and coin arrangement) to the top surface of the main body 2.

Figure 4:
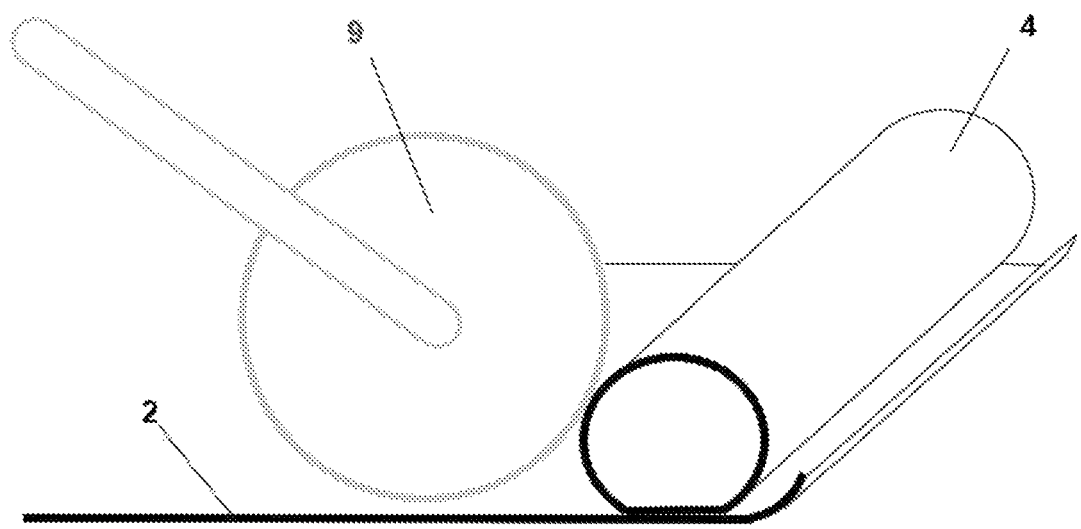
FIG. 4 shows a perspective view of the front end of the sled device of FIGS. 1 to 3 from the side and looking rearwards.

As the second part of the hook-and-loop fastening strip and coin arrangement is connected to the top surface of the main body 2 towards one end and slightly inwards of the end, when the cylinder element 4 is detachably connected to the main body 2, a section of the main body 2 extends beyond the cylinder element 4 between the cylinder section 4 and the end. In use, as shown in FIG. 4, this is folded or rolled back towards the cylinder section 4 such that it becomes elevated off the floor which prevents it from catching on the carpet or other asperities present on an uneven floor underneath.

An elasticated strap (not shown) can also be used to wrap around the main body once it is rolled up to assist with storage.

In use, the sled device is placed on the floor of a home next to or near the door through which the buggy or pram 9 will arrive. The buggy/pram 9 is manoeuvred up and over the first end chock 3, for example by lifting the front wheels by pivoting around the rear wheels/axle, moving the buggy 9 forwards, and then repeating this process by pivoting around the front wheel axis to lift the rear wheels, so that the buggy 9 is located fully on top of the sled 1, with its wheels between the end chock assemblies 3. The cylinder elements 4 are of sufficient size/diameter that the wheels of the buggy 9 will not be able to ride up and over these unless lifted upwards—if the buggy 9 is pushed horizontally (the same as for normal rolling use), the wheels will not ride up and over the cylinder elements 4. Additionally, the brake from the pram can be used to assist the pram with not riding up and over the cylinder elements.

Due to the low friction nature of the underside of the main body 2, the pram fully located on top of the sled can be pushed around the home over the top of the carpet or laminated flooring or wooden or stone or tile or similar floor surface. Any dirt, water or similar falling from the buggy 9 will fall onto the top surface of the main body 2 rather than the floor, and will be caught and retained thereon.

As buggies and prams are of different sizes, a user can customise or size the space between the end chock assemblies 3 by using the adhesive backing on the hook-and-loop sections, to position these where required on the upper face of the main body 2 so that the user's buggy is 'docked' securely between the end chock assemblies 3 when on the top of the sled 1.

In a variation of the embodiment described above, the plastic sheet will have sufficient structural integrity to be able to unroll itself either partly or fully unassisted if previously rolled up for storage to allow rapid deployment of the sled device.

Figure 5:
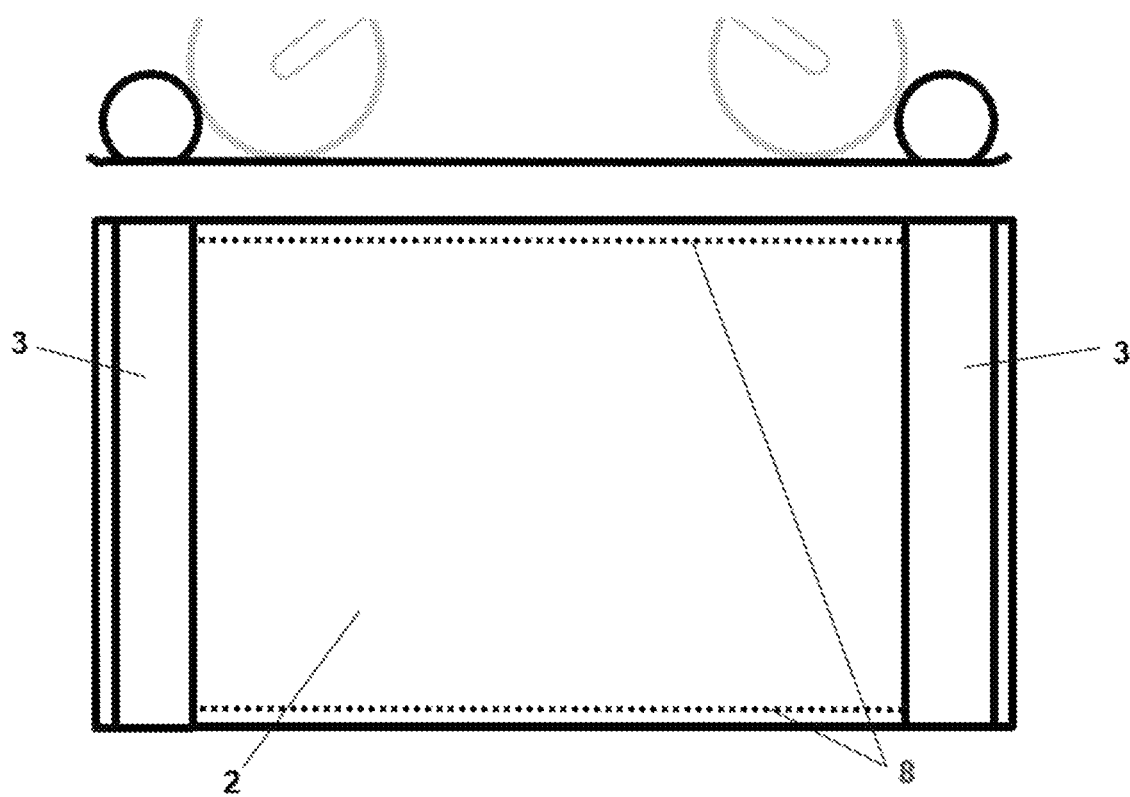
FIG. 5 shows a top or plan view of the sled device of an embodiment of the present invention, showing detail of raised side edges or raised ridges along the side of the main body.

In a variation on the embodiment described above, as shown in FIG. 5, two side ridges 8 extend along each of the longer sides of the main body 2, extending upwards a short distance from the main body 2. These assist with maintaining the water and dirt on the top surface, rather than this running off the sides. The side ridges can be an integral part of the main body, formed by turning or rolling the side edges upwards, or these can be a separate add-on item such as the 'e' or 'leaf' profiles described below.

Figure 6:
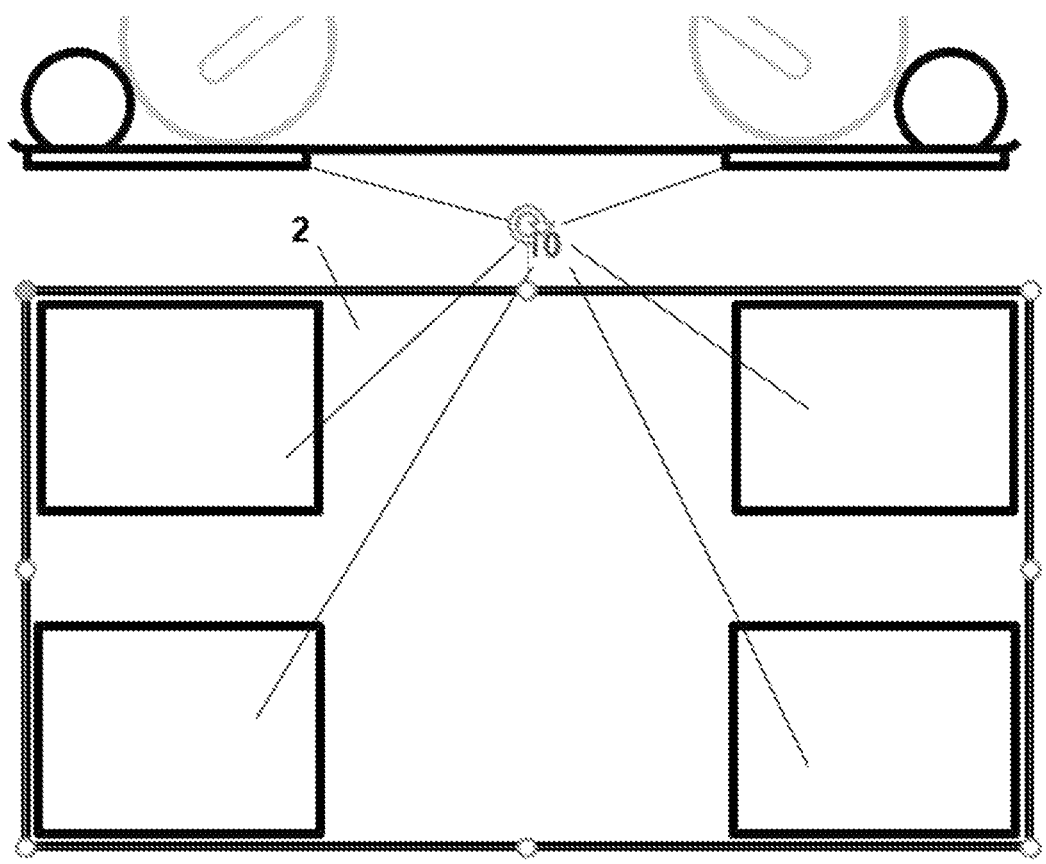
FIG. 6 shows an underside plan view of an alternative form of the main body of the sled device, showing detail of four additional adhesive backed felt pads that help protect the floor if the sled device is used on a non-carpeted surface such as wood or laminate or stone or tile or similar, the felt pads assisting with protecting the floor from the abrasive effect of dirt present on the floor, and to assist with sliding.

Another variation that can be used with any of the embodiments herein is shown in FIG. 6. In this embodiment adhesive backed felt pads 10 are located on the underside of the main body—e.g. main body 2. These help to protect the floor from being scratched by grit and small stones etc. and may also assist with the low friction nature of the underside if the sled 1 is used on non-carpeted surfaces such as laminated or wooden or stone or tile or similar floor surfaces when the pram is fully located on the top of the sled and is moved around on the floor.

Figure 7:
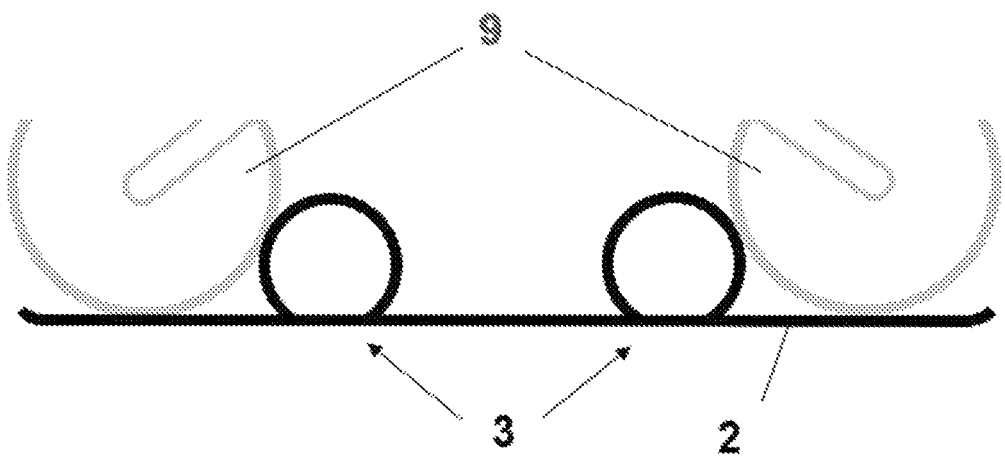
FIG. 7 shows a side view of a sled device according to an alternative embodiment of the sled device of the present invention, the front and rear end chocks in this embodiment positioned on the insides of the vehicle wheels.

In another variation, as shown in FIG. 7, the chocks 3 are positioned such that they are spaced so as to contact the vehicle wheel insides (rather than the outsides as for the embodiments described above). That is, they are inside the footprint (the perimeter in plan view) of the pram or other household vehicle, rather than on the outside. In this variation, the main body 2 has sufficient structural rigidity to allow a pram located on top of the sled to be pushed around. This variation can be used with any of the embodiments described herein, as appropriate.

Figure 8:
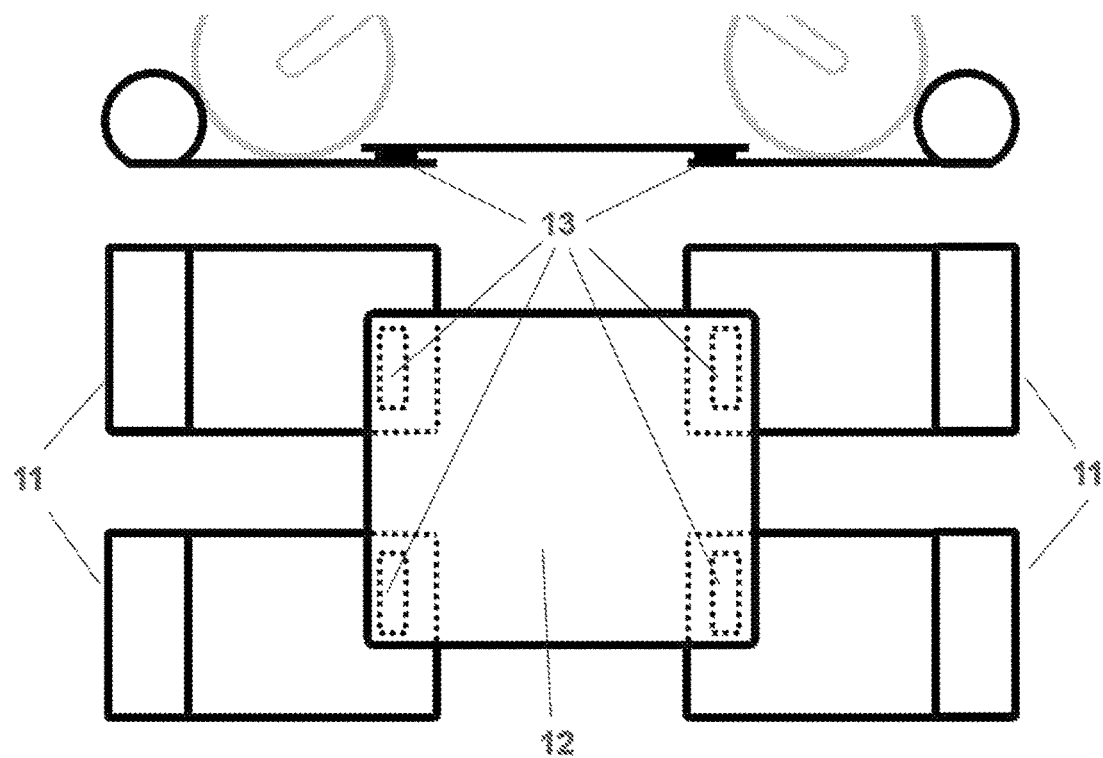
FIG. 8 shows a top or plan view of the sled device of a further alternative embodiment of the sled device of the present invention, showing detail of the main body and end chocks being constructed as independent interconnected components.

In another embodiment, as shown in FIG. 8, the sled is formed having a main central part 12 that is rectangular in cross section, and four separate/separable corner elements that are also rectangular in cross-section, the main central part and corner elements in this embodiment forming the main body. The central part 12 and corner elements are arranged in use so that in plan view (as shown in FIG. 8) the corners of the central part 12 overlap with and are on top of the inner corners of the corner elements. The overlapping corners of the central part 12 and the corner elements are linked by using a hook and loop fastening 13 on the adjacent contacting surfaces. This allows the user to customise the size and shape of the sled device to fit prams of different sizes. Each of the corner elements has a chock component 11 on it's outer end that supports and/or holds a wheel of the pram, similar to or the same as those for the previous embodiments.

Figure 9:
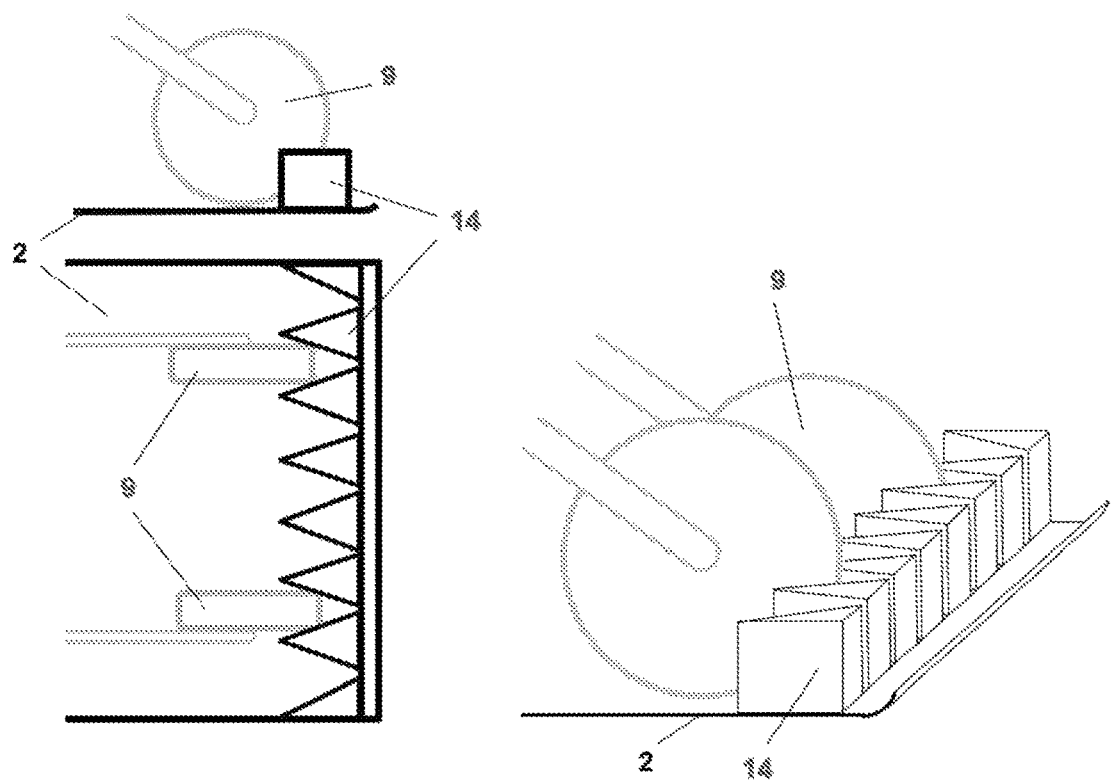
FIG. 9 shows a side view, a top or plan view, and a perspective view from the side and looking rearwards, of the front end of a sled device according to an embodiment of the present invention, the front and rear end chocks configured in this embodiment to prevent the vehicle from riding off the sled using friction by gripping the wheels by using one or more geometric features shown as wedge shapes placed side-by-side.

In another embodiment, as shown in FIG. 9, end chocks 14 are connected to and extend upwards from the main body. The end chocks 14 each comprise a row or series of wedges, oriented so that there is a vertically aligned gap between each wedge. In use, the wheels can be positioned in this gap so that the wedges directly to each side of the wheel grip and/or clamp to the side of the wheel to prevent the vehicle from riding off the sled device.

Figure 10A:
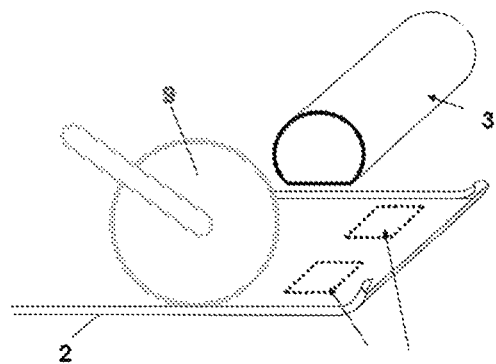
FIG. 10a shows a perspective exploded view of an embodiment of the front end of the sled device of the present invention from the side and looking rearwards, showing detail of the front end of the sled device with the main body rolled and/or folded along both the shorter and longer side edges of the main body, with sticky pads to hold the end chocks and main body in position.
Figure 10B:
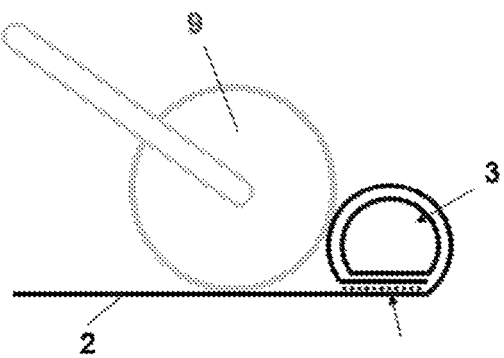

In another embodiment, as shown in FIGS. 10a and 10b, the width of the main body 2 can be adjusted by rolling or folding it along its long edges. The length can be adjusted in a similar manner. This allows the size and shape of the main body to be adjusted to fit prams of different lengths and/or widths. The end chocks can be held in position by using a detachable fastening such as a hook and loop fastening, reusable sticky pads, or double-sided adhesive tape, or by wrapping the main body partly or fully-over the end chocks and attaching the main body to itself.

Figure 11:
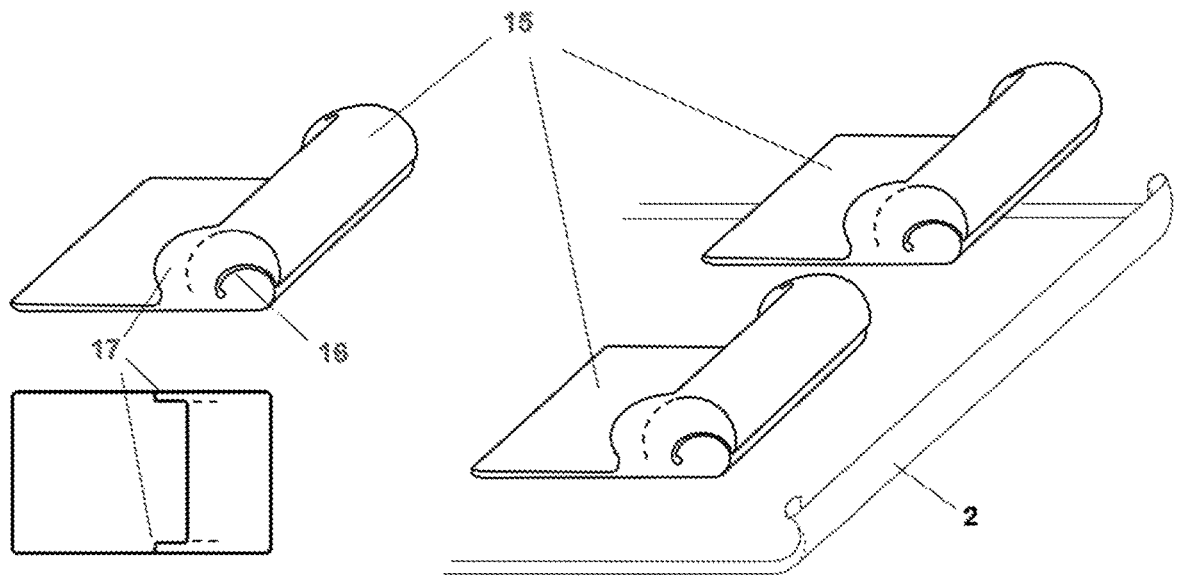
FIG. 11 shows an exploded perspective view and perspective assembled view of the front end of an embodiment of the sled device of the present invention from the side and looking rearwards, the edges of the main body rolled and/or folded and connected to a pair of front chocks at each of the front corners of the main body, the chocks having side barriers that align in use with the side edges of the main body along part of its length, to assist with preventing the param or other similar item from moving off the main body sideways.

In another embodiment, as shown in FIG. 11, a pair of shoe sections 15 are used at each end of the main body 2 as chocks, the shoe sections 15 located in each corner of the main body. Each of the shoe sections 15 has a shoe body part that in use prevent the wheels of a pram or similar from rolling forwards and backwards on the main body 2, and a pair of outside extension sections 17, one at each side of the shoe body. When the shoe 15 is positioned in use, these extensions are aligned in parallel to the long edges of the main body. The outer one of these outside extension sections 17 extends along the edge of the main body 2 from the corner, towards the other end of the main body. The other extension section is aligned in parallel with this at the other side of the shoe section. These extension sections prevent the wheels of a pram or similar on top of the main body from slipping off to the sides of the shoes 15. The shoes are connected to the main body 2 via rolled up end edges of the main body 2 that attach to the outer surface of the shoes 15 via an adjustable and/or detachable fastening such as a hook and loop fastening, and/or a friction grip 16 and/or a mechanical clamp.

Figure 12:
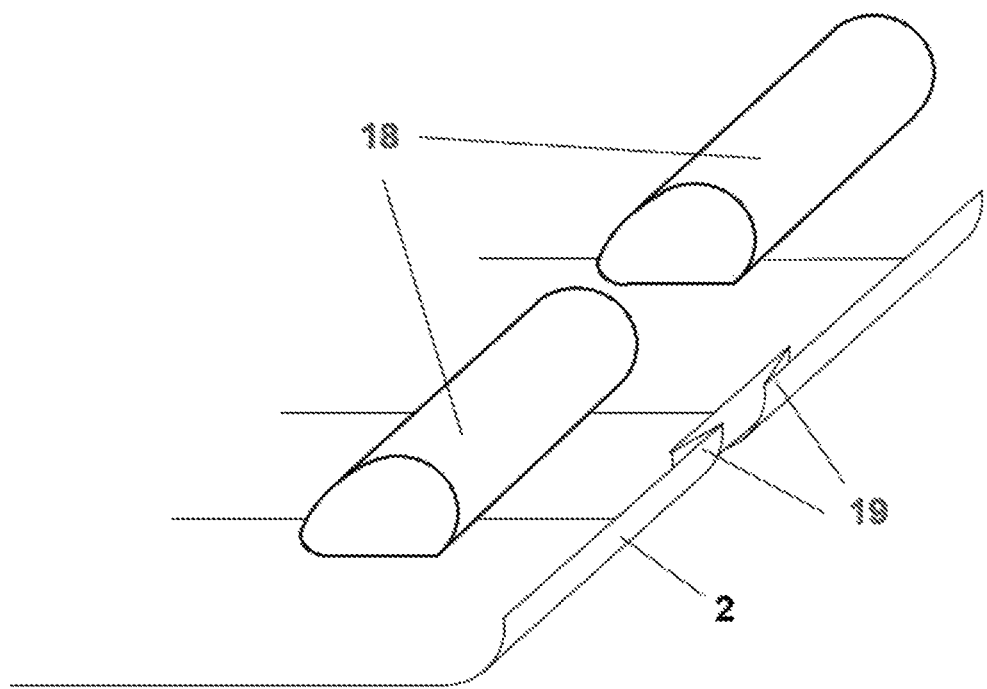
FIG. 12 shows an exploded perspective view of the front end of an embodiment of the sled device of the present invention from the side and looking rearwards, the main body in this embodiment foldable over-and-back onto itself to narrow the width of the main body, two separate end chocks located at the corners of the main body.

In another embodiment, as shown in FIG. 12, the main body 2 is adapted so that it has a central folded section where the two sides each side of a central section running along the central long axis of the main body 2 are folded under-and-back as shown at 19 in FIG. 12. This allows adjustment of the width of the main body from a first 'wide' state, to a second 'narrow' state (i.e. between unfolded and folded). Separate end chocks 18 are located in each corner, and are formed with a hook-receptive loop fabric on their outer surface, so that they can be connected to the main body 2 via a hook fastening. The front and back ends of the main body 2 wrap around and attach to the end chocks 18, and the overall length of the sled in this embodiment can be adjusted by wrapping either slightly more or slightly less of the main body 2 over the end chocks 18.

Figure 13:
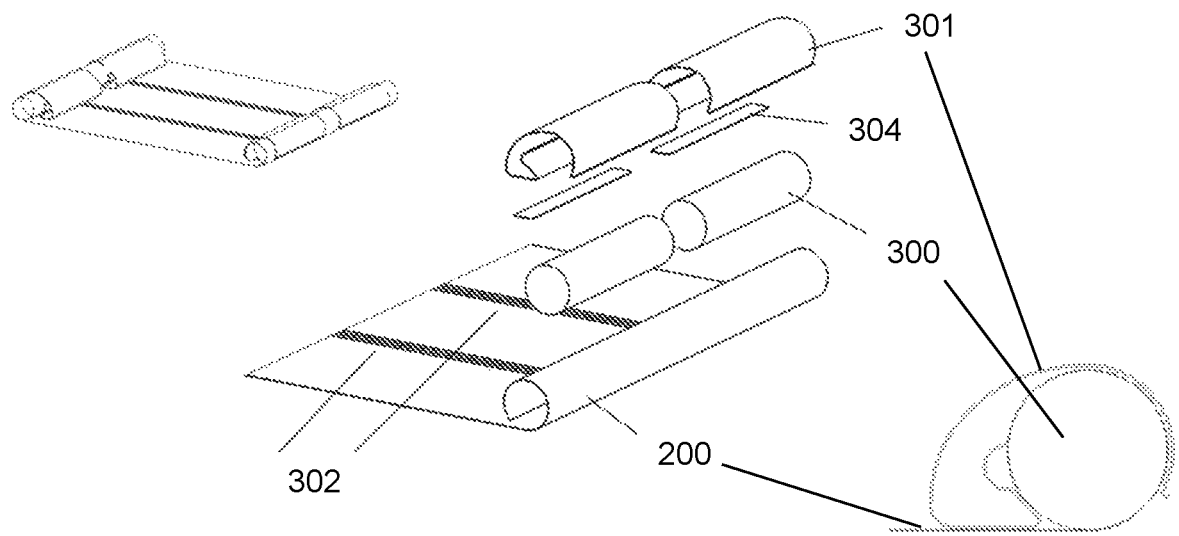
FIG. 13 shows an exploded perspective view of the front end of an embodiment of the sled device of the present invention from the side and looking rearwards, the end chocks in this embodiment formed by rolling the end of the main body around a foam roll and then holding this in place with a friction grip/snap clamp and sticky pad.

In another embodiment, as shown in FIG. 13, the end chocks of the main body 200 are formed by rolling the end of the main body around a foam roll 300 and then holding this in place with a friction grip/snap clamp 301 that extends around the outer part of the rolled-together foam roll and main body, and underneath the front side/edge of the main body. A high friction material (not shown) such as a reusable sticky pad or moulded rubber silicon may be also included on the inside of the snap clamp 301, to assist with preventing the main body from unrolling. The inner part of the clamp 301 is attached to the upper surface of the main body via a reusable sticky pad 304 or tape made from polyurethane or silicone gel, or similar. The snap clamps are substantially rigid (that is, they support their own weight without deforming, but can be bent or deformed in order to move them into and out of position around the rolled end).

In this embodiment, parallel groves 302 are shown running the length of the main body. These allow the main body 2 to be folded under-and-back as for the previous embodiment, to adjust the width.

It should be noted that the ability to roll the main body along both it's long and short axes cannot be done if the main body is made of polypropylene sheet or similar, as it will be too stiff to be rolled along both. The parallel grooves 302 allow size adjustment in both directions. However, if the main body is made from polythene, PVC, PEVA or nylon cloth, these materials are flexible enough to be rolled along both the longer and shorter side edges.

Figure 14:
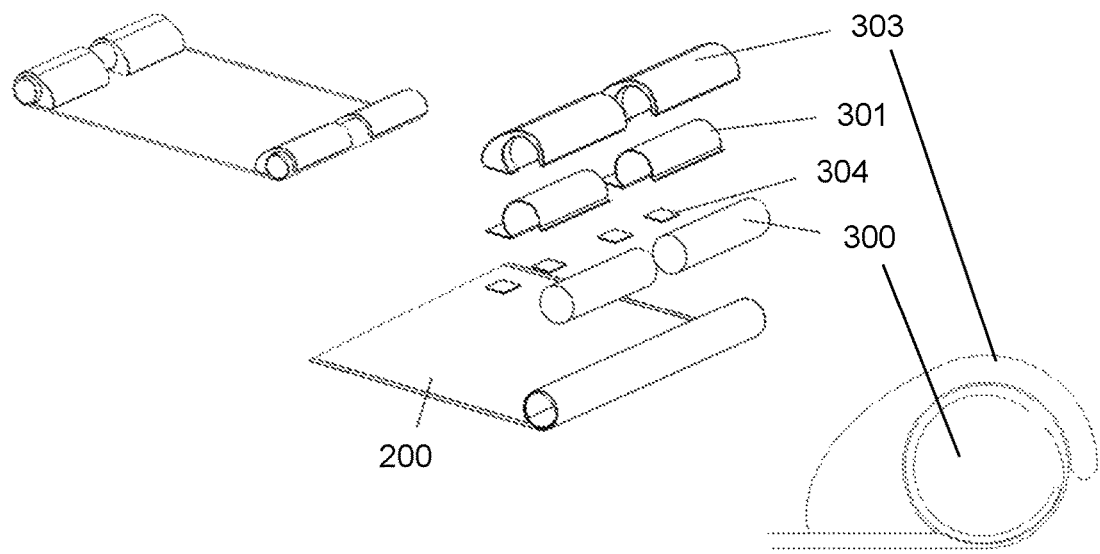
FIG. 14 shows a variation of the embodiment shown in FIG. 13, the friction grip/snap clamp having an additional foam cover.

A variation of the embodiment shown in FIG. 13 is shown in FIG. 14. In this embodiment, the friction grip/snap clamp 301 is accompanied by a foam cover 303.

Figures 15A, 15B:
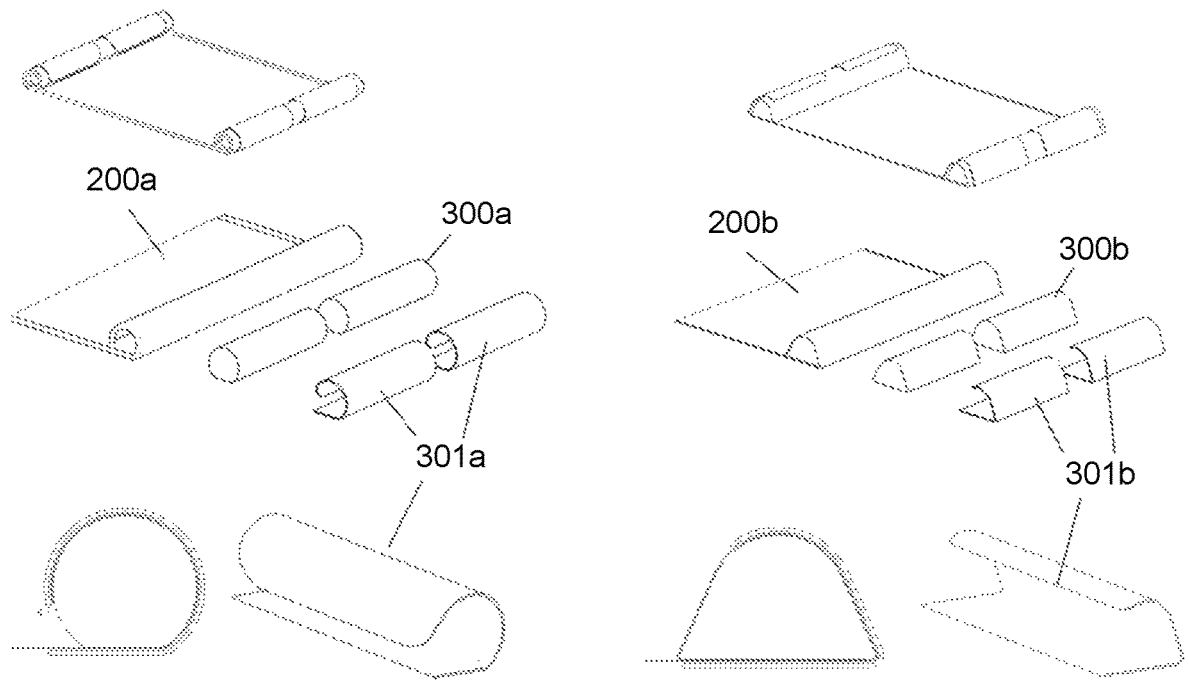
FIGS. 15a and 15b show an embodiment of sled device where the main body is rolled around foam end pieces, with a snap clamp fitted over the rolled end, the snap clamps in this embodiment substantially rigid, the underside of the snap clamps resting on the floor in use and allowing the sled to slide freely.

Other variations are shown in FIGS. 15a and 15b. In these variations, the main body 200 is rolled around a foam end piece or end pieces 300a or 300b, and a snap clamp 301a or 301b is then fitted over the rolled end. The snap clamps are substantially rigid (that is, they support their own weight without deforming, but can be bent or deformed in order to move them into and out of position around the rolled end). The underside of the snap clamps rest on the floor in use and allows the sled to slide freely.

As shown in FIGS. 15a and 15b, the foam end piece can be formed as one of a number of different shapes (e.g. circular with a flattened underside—end piece 300a as in FIG. 15a, or with a triangular cross-section with a rounded top—end piece 300b as in FIG. 15b), with the snap clamp 301a, 301b formed to substantially conform to this shape.

Figure 16:
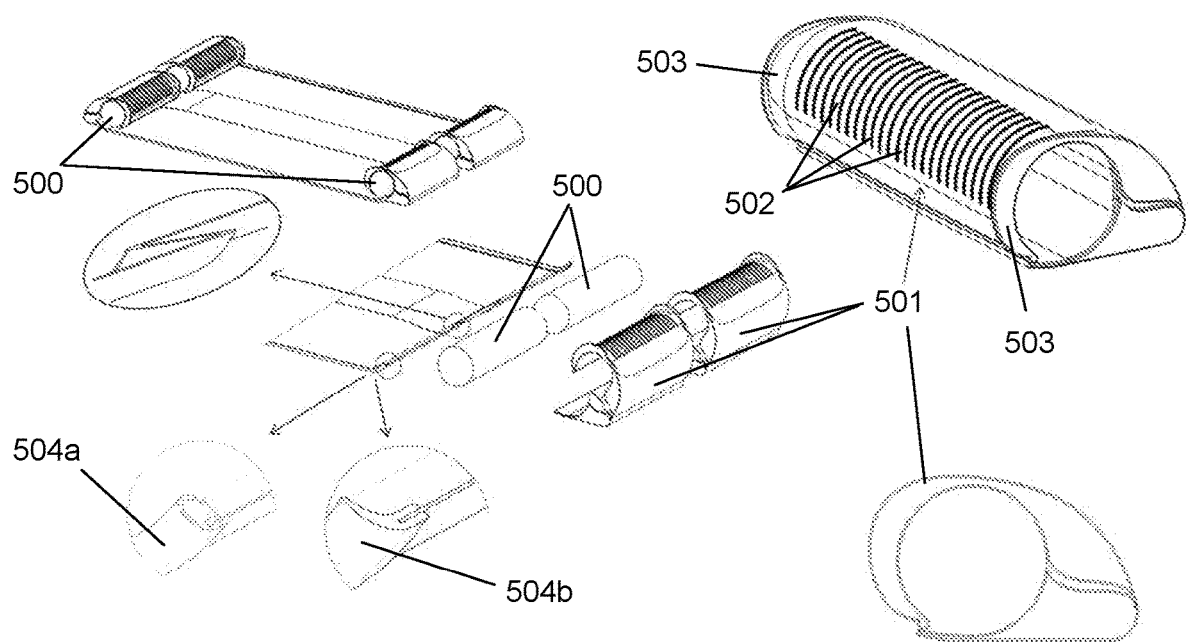
FIG. 16 shows an embodiment of sled device having a foldable main body the same as that used in the embodiment of FIGS. 12 and 13, with foam cylinders used at the ends to form the central part of the chocks, the main body rolled partly around these from the end, with a plastic injection moulded clamp used to grip around the rolled foam cylinder/main body, the clamp hinged via a living hinge and having a hollow central aperture that corresponds to the rolled foam/main body combination, the clamp having ribs on the inner face aligned in parallel with one another and so that in use they are parallel to the long edges of the main body, the clamp also having side walls at each end that extend inwards in parallel with the ribs.

A further embodiment is shown in FIG. 16. The main body used in this embodiment is the same as that used in the embodiment of FIGS. 12 and 13, with the main body having a central folding section. Foam cylinders 500 are used at the ends as the central part of the chocks, with the main body rolled partly around these from the end. A plastic injection moulded clamp 501 is used to grip around the rolled foam cylinder/main body. The clamp 501 is hinged via a living hinge and has a hollow central aperture that corresponds to the rolled foam/main body combination. An internal adjustable and releasable mechanism (not shown) forms part of the clamp 501, to lock and hold the clamp in place. The mechanism can be any suitable mechanism, and in this embodiment is an internal toothed ratchet-type mechanism. The clamp has ribs 502 on the inner face (towards the wheel of a pram or buggy in use). The ribs 502 are aligned in parallel with one another and so that in use they are parallel to the long edges of the main body. Larger side walls 503 at each end of the clamp 501 extend inwards in parallel with the ribs 502 to help keep the pram wheels from moving sideways on the sled in use. The clamp 501 has a rubber co-injection overmould on the surface, to give high friction against the pram wheels.

The main body in this embodiment is fitted with a separate raised edge trim feature 504 on the longer sides, to assist with the retention of water, dirt, or similar on the top of the main body.

Two example type profiles for the trim feature are shown: An 'e' profile 504a, and a 'leaf' profile 504b. Each of these is formed from PVC or rubber or similar, and has an integral slot, allowing it to be slotted onto the edge.

Figure 17:
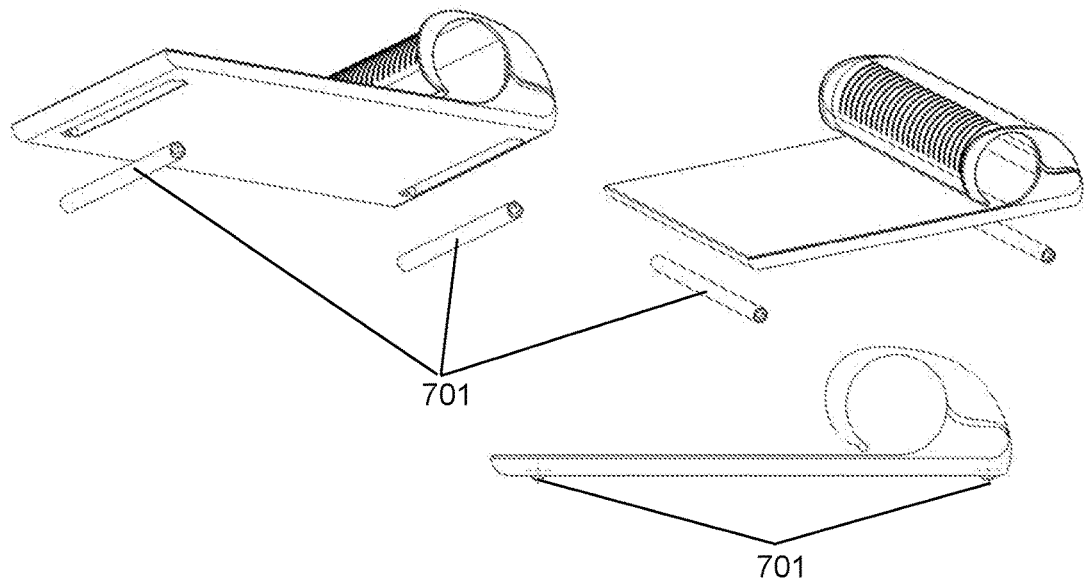
FIG. 17 shows a variation of the embodiment of FIG. 16, with the underside of the main body fitted with wheels or rollers to allow the sled to move by rolling, or by a combination of sliding and rolling.

A variation of the embodiment of FIG. 16 is shown in FIG. 17. In this variation, the underside of the main body is fitted with wheels 701 to allow the sled to move by rolling, or by a combination of sliding and rolling.

Figure 18:
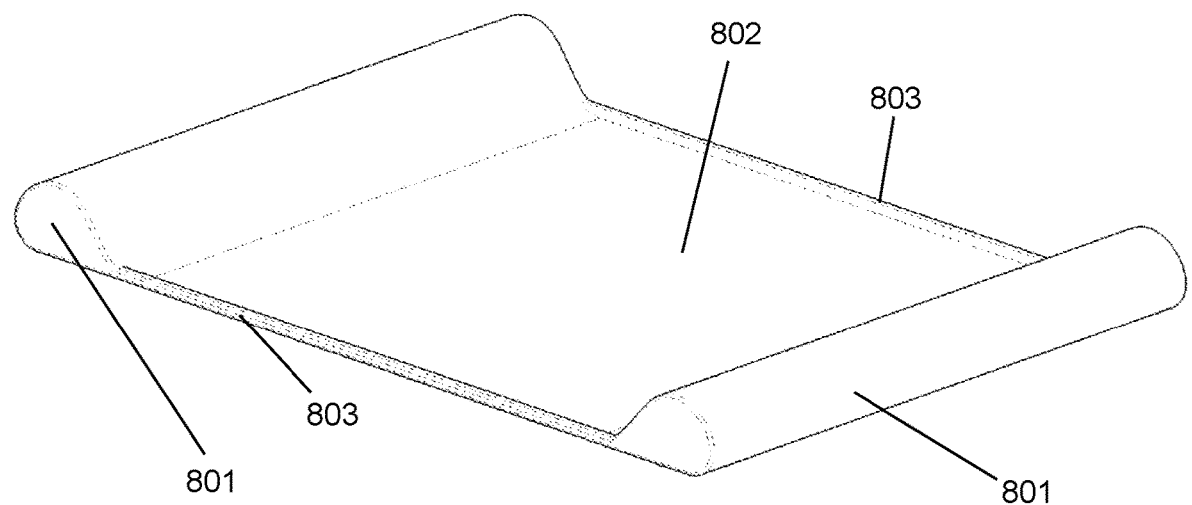
FIG. 18 shows an embodiment of sled formed as a single, unitary moulded unit, the chocks at each end formed integrally with the main body.

In another embodiment, as shown in FIG. 18, the sled can be formed as a single, unitary moulded unit, formed from rubber or plastic or similar, or can be inflatable, similar to an air mattress or similar item. In this embodiment, the chocks 801 at each end are formed integrally with the main body 802. The sled can be formed with or without side rails 803 along the edges to help retain water and dirt, and the end chocks can be formed in any required shape, such as circular, teardrop-shaped, triangular, or similar.

The sled of the present invention is advantageous as it does not require manual attachment of the sled to the buggy or pram via straps or clips or similar at one or both of the front and rear ends, that would require a user to bend or kneel down in order to operate or engage these with the buggy. These would also take time to engage and disengage, and this type of attachment may also potentially be unachievable due to space restrictions in the storage area or other area where a user must make or unmake the attachment. Avoiding any manual attachment minimises the risk of disturbing a baby if asleep in the pram, and also avoids complex and difficult manoeuvres needing to be performed e.g. in the case of wheel covers whereby the user must make the attachment whilst also tilting the pram several times to lift each wheel in-turn off the floor, and also whilst bending or kneeling. The sled is further advantageous as there is much lower risk of getting the users hands dirty, as there is no need for a user to use their hands in order to make the attachment. Additionally, manual attachment methods typically act to wrap and contain wet wheels and other surfaces which make drying a slower and more difficult process which increases the risk of mould and bacterial build-up. However any wet or dirty surfaces of the present invention in contrast stay substantially open to the environment and allow for good air circulation for drying thereby minimising risk of mould and bacteria build up. A pram or buggy can simply be manoeuvred onto the sled of the present invention by the user, and once in position the sheet and pram move around together when the pram is pushed or pulled, which may be assisted with the pram brake being applied. The pram or buggy can then be manoeuvred off the sled without needing to undo or unfasten straps. Additionally, a variation of the sled device will be able to unroll itself either partly or fully unassisted if previously rolled up for storage to allow rapid deployment of the sled device making it simpler to use and further reducing the time taken to operate.

A temporarily attachable sled device such as the one described provides a mechanism by which a human-powered device, such as a pram or similar (e.g. pushchair, buggy or stroller) or bicycle, or wheelchair, or golf caddy or similar device can be contained and moved by sliding over an indoor floor surface using a low friction material (e.g. plastic) and which acts as a waterproof barrier preventing rainwater and/or mud (from the pram and/or wheels) from reaching the floor.

The invention claimed is:

1. A temporarily attachable sled device for human-powered household vehicles, comprising:
   a main body comprising a substantially waterproof sheet, substantially at least the lower face of the sheet formed as a low friction surface, the main body having an upper surface and ridges along and extending upwards from each side of the main body, the ridges extending substantially a length of the sides; and at least one front end chock assembly and at least one rear end chock assembly extending from the upper surface of the main body in use, the main body and the chock assemblies being sized and shaped so that a household vehicle can be positioned on the upper surface of the main body and prevented from riding up and over the chock assemblies.

2. A sled device as claimed in claim 1 wherein the main body is substantially formed from a square or rectangular sheet, and comprises a central section that can be folded.

3. A sled device as claimed in claim 2 wherein the main body comprises a central folded section configured so that each side of a central section running along a central long axis of the main body can be folded under-and-back.

4. A sled device as claimed in claim 2 further comprising a set of wheels or rollers located on an underside of the main body.

5. A sled device as claimed in claim 2 further comprising at least one pad of soft material attached to an underside of the main body.

6. A sled device as claimed in claim 5 wherein the at least one pad comprises four pads attached to the underside of the main body at or towards corners of the main body.

7. A sled device as claimed in claim 1 wherein the main body is substantially formed from plastic.

8. A sled device as claimed in claim 1 wherein the main body comprises a main central part and a plurality of separate/separable end parts arranged in use to partly overlap, the central part and separate/separable end parts connected at their overlapping parts, each of the end parts comprising a chock component on its outer end configured to support and/or hold a part of a household vehicle positioned on a corner element.

9. A sled device as claimed in claim 8 wherein the central part and separate/separable end parts are connected at their overlapping parts via a hook and loop fastening on adjacent contacting surfaces.

10. A sled device as claimed in claim 1 wherein each chock assembly comprises a substantially solid element having at least one face, the face and portions of the upper surface face towards ends of the main body comprising a mutual connection configured to allow releasable connection of the front and rear end chock assemblies to the upper surface of the main body.

11. A sled device as claimed in claim 10 wherein the mutual connection is one or more of a hook-and-loop fastener, sticky pads, and double-sided adhesive tape.

12. A sled device as claimed in claim 10 wherein the mutual connection comprises wrapping the main body partly or fully over the end chock assemblies and attaching the main body to itself by one or more of a hook-and-loop fastener, sticky pads, and double-sided adhesive tape.

13. A sled device as claimed in claim 1 wherein each chock assembly comprises a row or series of wedges, oriented so that there is a vertically aligned gap between each wedge, the wedges configured so that in use, a wheel or similar part of a household vehicle can be positioned in the gap so that the wedges grip and/or clamp the wheel or similar part of a household vehicle to prevent the vehicle from riding off the sled device.

14. A sled device as claimed in claim 1 wherein each chock assembly comprises a shoe section comprising a shoe body part configured to block movement of a household vehicle located on the main body and prevent the household vehicle from moving over or through the shoe section, and a pair of outside extension sections at each side of the shoe body, the extension sections configured to prevent the household vehicle on top of the main body from slipping off to the sides of the shoe sections.

15. A sled device as claimed in claim 14 wherein the shoes sections are connected to the main body by rolled up end edges of the main body that attach to outer surfaces of the shoes sections by an adjustable and/or detachable fastening comprising one of more of a hook and loop fastening, a friction grip; and a mechanical clamp.

16. A sled device as claimed in claim 1 wherein the chock assemblies comprise a foam roll and main body end, the end of the main body rolled around the foam roll, the chock assemblies further comprising a friction grip/snap clamp configured to extend around an outer part of the rolled-together foam roll and main body, the friction grip/snap clamp at least partly formed from a semi-rigid material so that the friction grip/snap clamp holds its shape in use.

17. A sled device as claimed in claim 16 wherein the snap clamp is configured so that an underside of the snap clamp extends to rest on a floor in use.

18. A sled device as claimed in claim 1 wherein the chock assemblies comprise foam cylinders, the main body rolled partly around the foam cylinders, and a clamp, the clamp configured with a hollow central aperture that corresponds to the rolled foam/main body combination, the clamp gripping around the rolled foam cylinder/main body in use, the clamp configured to open via a hinge and to lock in position in use.

19. A sled device as claimed in claim 18 wherein the clamp further comprises a plurality of ribs aligned in parallel with one another in use in parallel with long edges of the main body.

20. A sled device as claimed in claim 19 wherein the clamp further comprises side walls at each end of the clamp, extend inwards in parallel with the ribs, the walls configured to prevent sideways movement of an item on the sled in use.

21. A sled device as claimed in claim 18 wherein the clamp further comprises a high-friction layer on at least part of an inner surface of the central aperture.

22. A sled device as claimed in claim 1 wherein the chock assemblies are positioned so that in use a household vehicle is positioned inside the chock assemblies.

23. A sled device as claimed in claim 1 wherein the chock assemblies are positioned so that in use the chock assemblies are positioned on the inside of a footprint of the household vehicle.

* * * * *